Patented June 2, 1936

2,042,658

UNITED STATES PATENT OFFICE 2,042,658

NITRO-DERIVATIVES OF 2-HYDROXYNAPH-THALENE-1-SULPHONIC ACID-3-CARBOX-YLIC ACID AND PROCESS OF PREPARING THEM

Ernst Hotz, Hattersheim-on-the-Main, and Wilhelm Luce, Hofheim-on-the-Taunus, Germany, assignors to General Aniline Works, Inc., New York, N. Y., a corporation of Delaware No Drawing. Application July 16, 1935, Serial No. 31,724. In Germany July 21, 1934

4 Claims. (Cl. 260—110)

The present invention relates to nitro-derivatives of 2 - hydroxynaphthalene - 1 - sulphonic acid-3-carboxylic acid and to a process of preparing them; more particularly it relates to compounds of the following general formula:

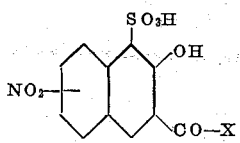

wherein the nitro-group stands in one of the positions 6 and 8, and X stands for hydroxy or an alkoxy group.

As is known 1,6-dinitro-2-naphthol is obtained by nitrating 2-naphthol-1-sulphonic acid, the sulphonic acid group being eliminated (Berichte der Deutschen Chemischen Gesellschaft, vol. 15, page 202). According to the present invention nitro-sulphonic acid derivatives of 2,3-hydroxy-naphthoic acid may be obtained by nitrating 2-hydroxy-naphthalene - 1 - sulphonic acid-3-carboxylic acid, its derivatives or substitution products, the sulphonic acid group, in general, remaining in place.

The new compounds are valuable intermediate products which may be subjected to various reactions. They may be reduced to form the corresponding amino-sulphonic acids; by splitting off the sulphonic acid group, the corresponding nitro- and amino-derivatives of 2,3-hydroxy-naphthoic acid may be obtained which are capable of being combined with diazo-compounds.

The following examples serve to illustrate the invention, but they are not intended to limit it thereto; the parts are by weight:

(1) 268 parts of anhydrous 2-hydroxy-naphthalene-1-sulphonic acid-3-carboxylic acid are stirred at a temperature of 10° C. into 1500 parts of sulphuric acid monohydrate, the whole is cooled to a temperature of −10° C., and at a temperature of −10° C. to −5° C., 220 parts of a nitrating acid containing 66 parts of $HNO_3$ and 154 parts of $H_2SO_4$ are stirred in. After stirring for one hour the solution is poured on 3000 parts of ice. The precipitate thus obtained is filtered with suction and washed.

By salting out the mineral acid solution with sodium chloride, a yellow nitro-compound is obtained which consists for the greater part of the sodium salt of the hitherto unknown 6-nitro-2-hydroxynaphthalene -1- sulphonic acid -3- carboxylic acid. By reducing this compound the corresponding amino-sulphonic acid is obtained.

By boiling the acid with mineral acid the sulphonic acid group may be split off from the nitro sulphonic acid and also from the amino-sulphonic acid; in this manner the hitherto unknown 6-nitro-2-hydroxy-naphthalene-3-carboxylic acid, melting at 267° C., and the known 6-amino-2-hydroxy - naphthalene - 3 - carboxylic acid are obtained.

(2) 20 parts of 2-hydroxynaphthalene-1-sulphonic acid-3-carboxylic acid containing water of crystallization (molecular weight 340) are dissolved in 200 parts of water. At 25° C. 30 parts of nitric acid of 67 per cent strength are stirred into the solution and the mixture is allowed to stand for 48 hours. The precipitate formed is filtered with suction. It consists of a mixture of 8-nitro- and 1-nitro-2-hydroxynaphthalene-3-carboxylic acid. These two nitro-derivatives may be separated from each other by dissolving the mixture in sodium carbonate solution and precipitating with acetic acid, since the 1-nitro-acid may be precipitated from an alkaline solution with much greater difficulty than the 8-nitro acid.

The aqueous nitric acid solution contains the same 6-nitro-2-hydroxynaphthalene-1-sulphonic acid-3-carboxylic acid as described in Example 1; by addition of sodium chloride, the acid may be precipitated in the form of the sodium salt.

(3) 282 parts of nitric acid of 67 per cent strength, 91 parts of nitric acid of 99 per cent strength and 8 parts of aminosulphonic acid are mixed and cooled to a temperature of −15° C. To the solution thus obtained there are added, while stirring, 60 parts of 2-hydroxy-naphthalene-1-sulphonic acid-3-carboxylic acid containing water of crystallization (molecular weight 340) and then a mixture of 151 parts of nitric acid of 99 per cent strength and 6 parts of aminosulphonic acid. After stirring for about 1 hour the sulphonic acid has dissolved nearly completely. The solution is then poured in 1000 parts of ice-water; any turbid matter which may have precipitated is filtered with suction.

The solution thus obtained mainly contains in about equal parts the hitherto unknown 8-nitro-2-hydroxy-naphthalene-1-sulphonic acid-3-carboxylic acid and the 6-nitro-2-hydroxynaphthalene-1-sulphonic acid-3-carboxylic acid which may be salted out from the solution by addition of sodium chloride.

Of these two nitro-sulphonic acids the 8-nitro-derivative has the property that it loses the sulphonic acid group already at room temperature when it is allowed to stand in a mineral acid solution, whereas the 6-nitro-derivative loses the sulphonic acid group when it is boiled in a mineral acid solution. In order to separate the isomers, the solution is allowed to stand for 24 hours at a temperature of 20° C., and the precipitated 8-nitro-2-hydroxynaphthalene-3-carboxylic acid is filtered with suction. The 6-nitro-2-hydroxynaphthalene-1-sulphonic acid-3-carboxylic acid may be obtained by salting it out from the filtrate with sodium chloride as described in Example 1.

The 8-nitro-2-hydroxynaphthalene-3-carboxylic acid contains as by-product an unknown dinitro-2-hydroxynaphthalene-3-carboxylic acid from which it may be separated by dissolving the mixture in sodium carbonate solution and precipitating with acetic acid.

(4) At 0° C., 73 parts of aminosulphonic acid are added, while stirring, to 3410 parts of nitric acid of 73 per cent strength and the whole is cooled to a temperature of —20° C. 550 parts of 2-hydroxynaphthalene-1-sulphonic acid-3-carboxylic acid-ethylester containing water of crystallization (molecular weight 550) are added, while stirring. To the mixture thus obtained there is added, while stirring, a nitrating acid obtainable from 348 parts of nitric acid of 98.5 per cent strength and 14 parts of aminosulphonic acid. The whole is then stirred for 4 hours at a temperature of —20° C. and, thereupon, for 2½ hours at a temperature of —10° C., and then the reaction mixture is poured into 10,000 parts of ice-water. The solution thus obtained mainly contains the 8- and 6-nitro-derivatives of the 2-hydroxynaphthalene-1-sulphonic acid-3-carboxylic acid-ethylester.

In order to separate the mixture of isomers, the whole is worked up as described in Example 3. The solution is allowed to stand for 24 hours at a temperature of 20° C. and the precipitated 8-nitro-2-hydroxynaphthalene-3-carboxylic acid is filtered with suction. It may be purified as described in Example 3.

The sodium salt of 6-nitro-2-hydroxynaphthalene-1-sulphonic acid-3-carboxylic acid-ethylester is obtained by salting it out from the acid filtrate with sodium chloride. It dissolves in water to a yellow solution and in sodium carbonate- and sodium hydroxide-solution to an orange-red solution. By boiling it with a mineral acid the 6-nitro-2-hydroxynaphthalene-3-carboxylic acid-ethylester and the 6-nitro-2-hydroxynaphthalene-3-carboxylic acid are obtained.

By using in Example 4 instead of 2-hydroxynaphthalene-1-sulphonic acid-3-carboxylic acid-ethylester the 2-hydroxynaphthalene-1-sulphonic acid-3-carboxylic acid-methylester, the 8- and 6-nitro-derivatives of 2-hydroxynaphthalene-1-sulphonic acid-3-carboxylic acid-methylester are obtained.

We claim:

1. The process which comprises acting with nitrating agents upon compounds of the following general formula:

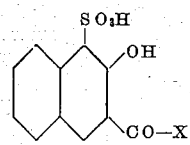

wherein X stands for a member of the group consisting of hydroxy and alkoxy.

2. The compounds of the following general formula:

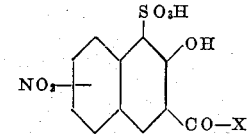

wherein the nitro-group stands in one of the positions 6 and 8, and X stands for a member of the group consisting of hydroxy and alkoxy, being easily soluble in water to a yellow solution, difficultly soluble in organic solvents and having the property of splitting off the sulphonic acid group by treatment with a mineral acid.

3. The compounds of the following general formula:

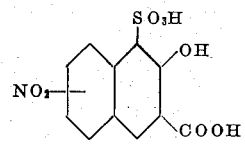

where the nitro-group stands in one of the positions 6 and 8, being easily soluble in water to a yellow solution, difficultly soluble in organic solvents and having the property of splitting off the sulphonic acid group by treatment with a mineral acid.

4. The compound of the following formula:

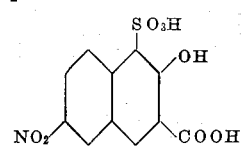

being easily soluble in water to a yellow solution, difficultly soluble in organic solvents and having the property of splitting off the sulphonic acid group by heating with a mineral acid.

ERNST HOTZ.
WILHELM LUCE.